(12) United States Patent
Padhye

(10) Patent No.: US 10,140,835 B2
(45) Date of Patent: Nov. 27, 2018

(54) MONITORING OF VECTORS FOR EPIDEMIC CONTROL

(71) Applicant: Cisco Technology, Inc., San Jose, CA (US)

(72) Inventor: Jaideep Padhye, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/479,881

(22) Filed: Apr. 5, 2017

(65) Prior Publication Data

US 2018/0293869 A1    Oct. 11, 2018

(51) Int. Cl.
| | | |
|---|---|---|
| *G08B 21/00* | (2006.01) | |
| *G08B 21/18* | (2006.01) | |
| *B64C 39/02* | (2006.01) | |
| *G05B 13/02* | (2006.01) | |
| *G06G 7/48* | (2006.01) | |
| *G01N 33/48* | (2006.01) | |
| *G06F 17/00* | (2006.01) | |
| *G06F 17/30* | (2006.01) | |

(52) U.S. Cl.
CPC .......... *G08B 21/182* (2013.01); *B64C 39/024* (2013.01); *B64C 2201/12* (2013.01)

(58) Field of Classification Search
CPC .. G08B 21/182; B64C 39/024; B64C 2201/12
USPC ....................................................... 340/540
See application file for complete search history.

(56) References Cited

U.S. PATENT DOCUMENTS

| | | | |
|---|---|---|---|
| 9,460,263 B2 | 10/2016 | Holmes et al. | |
| 2008/0172352 A1* | 7/2008 | Friedlander | G06N 7/08 706/46 |
| 2010/0250497 A1* | 9/2010 | Redlich | F41H 13/00 707/661 |
| 2014/0018097 A1 | 1/2014 | Goldstein | |
| 2014/0309942 A1* | 10/2014 | Anderson | G01N 33/186 702/19 |
| 2015/0019185 A1* | 1/2015 | Cunningham | G06F 17/5009 703/6 |
| 2017/0103172 A1* | 4/2017 | Fink | G06N 3/08 |

FOREIGN PATENT DOCUMENTS

| | | | |
|---|---|---|---|
| WO | WO-2016064735 A1 | 4/2016 | |
| WO | WO-2016168347 A1 | 10/2016 | |

OTHER PUBLICATIONS

"PM2.5 and PM10 Particle Sensor Analog Front-End for Air Quality Monitoring Reference Design", http://www.ti.com/tool/TIDA-00378, 3 pages, Accessed Jan. 3, 2017, Texas Instruments Incorporated.

(Continued)

*Primary Examiner* — Jack K Wang
(74) *Attorney, Agent, or Firm* — Parker Ibrahim & Berg LLP; James M. Behmke; Stephen D. LeBarron

(57) ABSTRACT

In one embodiment, a computing device receives vector data from a plurality of vector-identifying sensors distributed across an area associated with the computing device. The computing device may then determine an amount of vectors within the area based on the vector data, and compares the amount of vectors to a threshold associated with the area. In response to the amount being greater than the threshold, the computing device may then trigger a remediation alarm, accordingly.

20 Claims, 9 Drawing Sheets

(56) References Cited

OTHER PUBLICATIONS

Batista, et al., "Towards Automatic Classification on Flying Insects using Inexpensive Sensors", 2011 10th International Conference on Machine Learning and Applications and Workshops, Honolulu, HI, 2011, pp. 364-369, IEEE.

Ravi, et al., "Preventive Detection of Mosquito Populations using Embedded Machine Learning on Low Power IoT Platforms", ACM Dev '16, 10 pages, 2016, ACM.

Raman, et al., "Detecting Insect Flight Sounds in the Field: Implications for Acoustical Counting of Mosquitoes", Transactions of the ASABE, vol. 50(4), pp. 1481-1485, 2007, American Society of Agricultural and Biological Engineers.

* cited by examiner

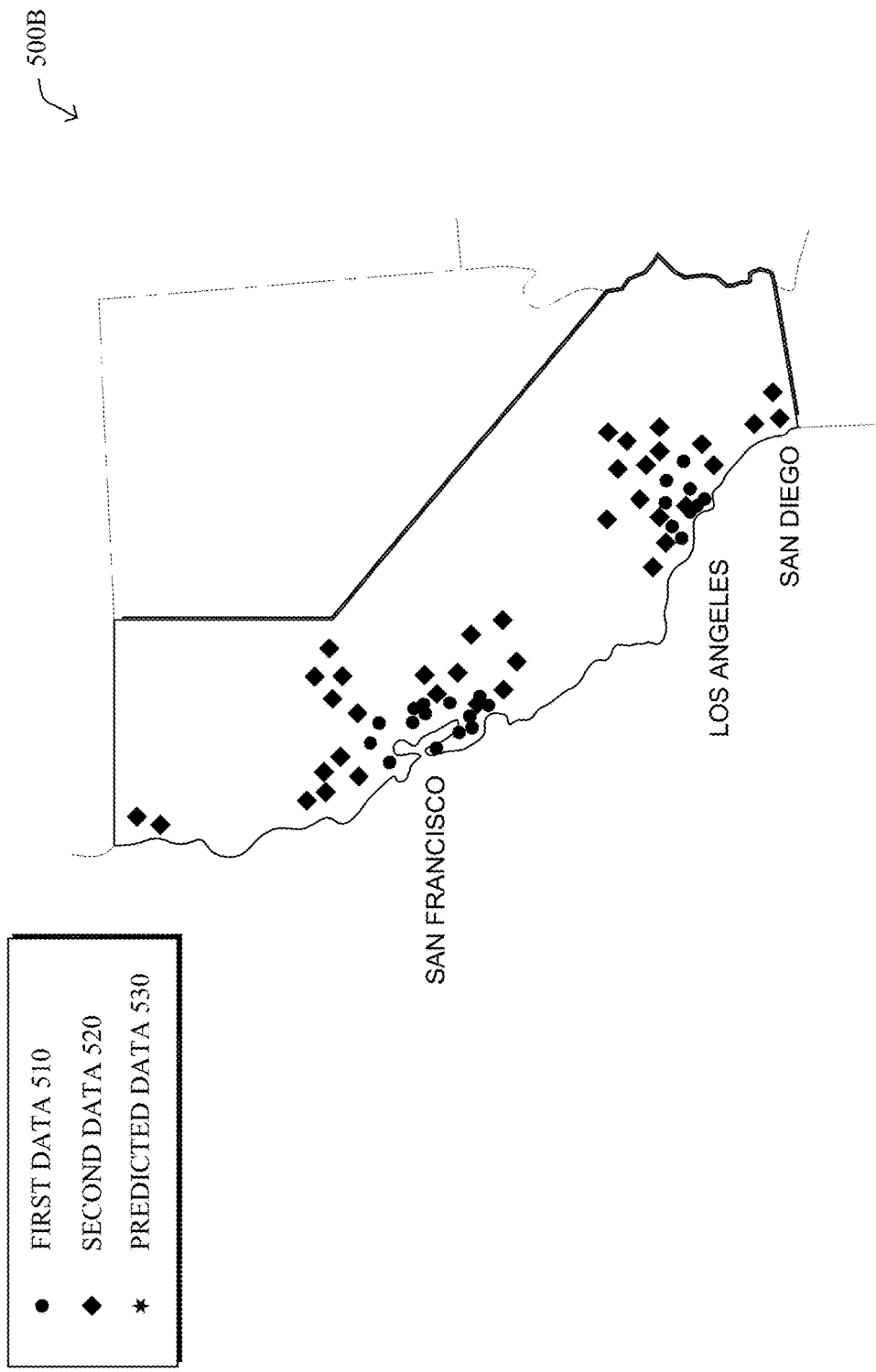

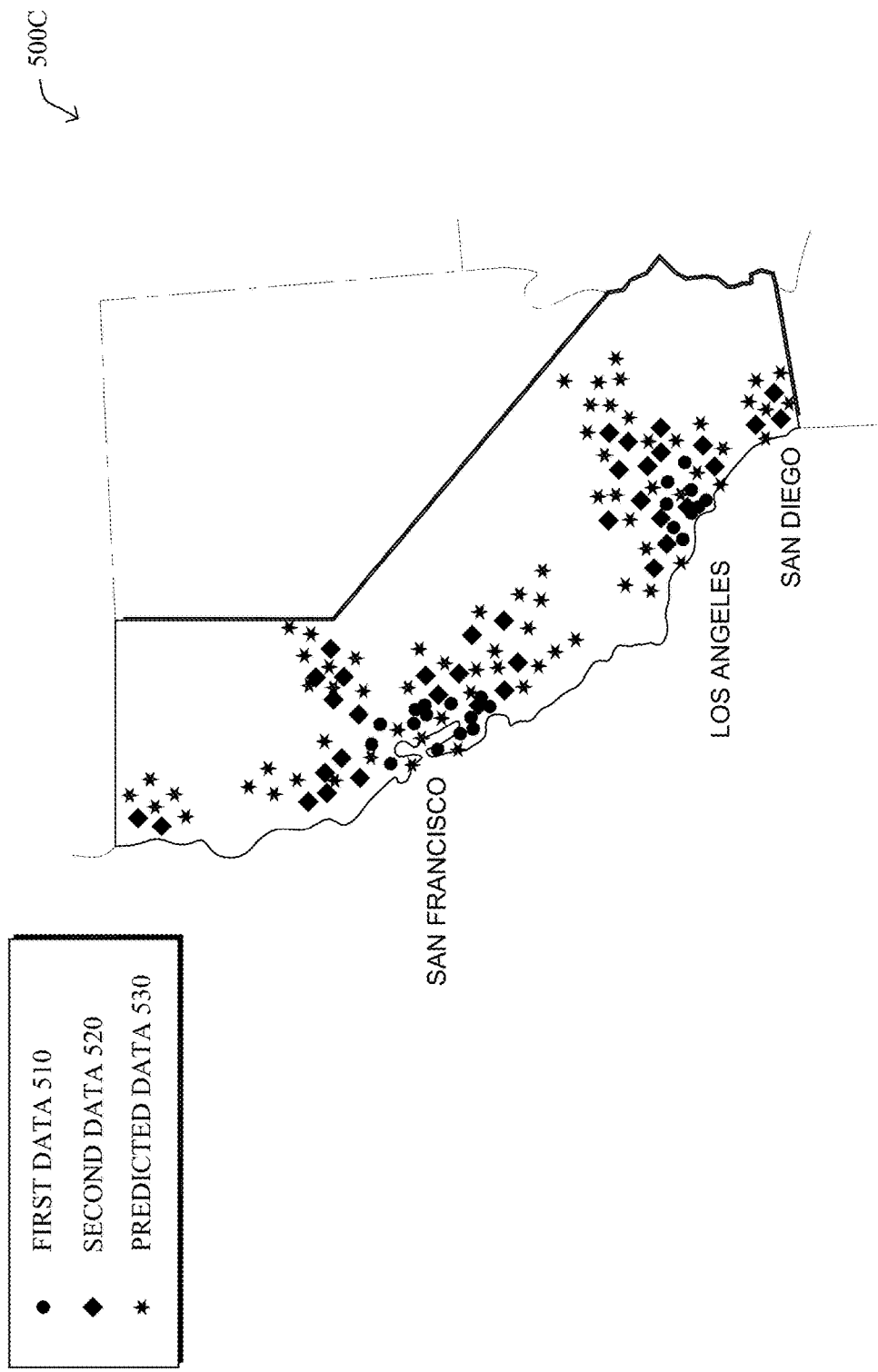

US 10,140,835 B2

MONITORING OF VECTORS FOR EPIDEMIC CONTROL

TECHNICAL FIELD

The present disclosure relates generally to computer networks, and, more particularly, to monitoring of vectors for epidemic control.

BACKGROUND

Mosquitos and other similar flying insects are the vectors for some of the most deadly diseases known to humans. Diseases like malaria and dengue kill millions of people in the developing world every year. Vector control is one of the most effective ways to ensure that the diseases do not spread. The best chance of controlling disease vectors is to apply interventions at the right time to control the vector population. The interventions for controlling vectors, however, are prohibitively costly when broadly applied.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 5A-5C illustrate an example of vector data analysis over a geographic area;

DESCRIPTION OF EXAMPLE EMBODIMENTS

Overview

Figure 1:
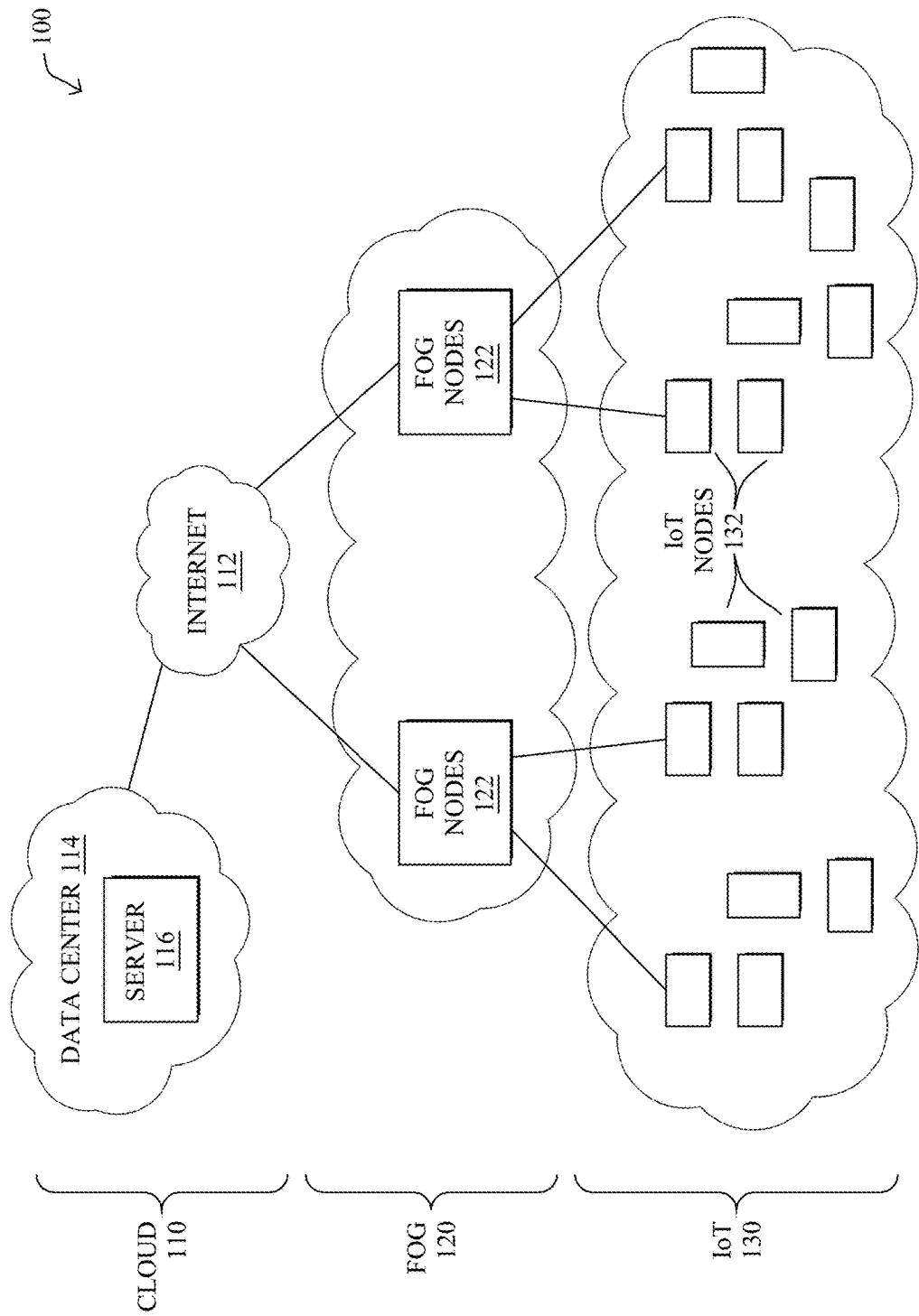
FIG. 1 illustrates an example computer network.

According to one or more embodiments of the disclosure, a computing device (e.g., Edge/Fog device) receives vector data from a plurality of vector-identifying sensors distributed across an area associated with the computing device. The computing device may then determine an amount of vectors within the area based on the vector data, and compares the amount of vectors to a threshold associated with the area. In response to the amount being greater than the threshold, the computing device may then trigger a remediation alarm, accordingly.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. Other types of networks, such as field area networks (FANs), neighborhood area networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh networks, such as wireless or PLC networks, etc., and are often on what is referred to as Low-Power and Lossy Networks (LLNs), which are a class of network in which both the routers and their interconnect are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Fog computing is a distributed approach of cloud implementation that acts as an intermediate layer from local networks (e.g., IoT networks) to the cloud (e.g., centralized and/or shared resources, as will be understood by those skilled in the art). That is, generally, fog computing entails using devices at the network edge to provide application services to the local nodes in the network, in contrast to cloud-based approaches that rely on remote data centers/cloud environments for the services. To this end, a fog node is a functional node that is deployed close to fog endpoints to provide computing, storage, and networking resources and services. Multiple fog nodes organized or configured together form a fog system, to implement a particular solution. Fog nodes and fog systems can have the same or complementary capabilities, in various implementations. That is, each individual fog node does not have to implement the entire spectrum of capabilities. Instead, the fog capabilities may be distributed across multiple fog nodes and systems, which may collaborate to help each other to provide the desired services. In other words, a fog system can include any number of virtualized services and/or data stores that are spread across the distributed fog nodes. This may include a master-slave configuration, publish-subscribe configuration, or peer-to-peer configuration.

FIG. 1 is a schematic block diagram of an example simplified computer network 100 illustratively comprising nodes/devices at various levels of the network, interconnected by various methods of communication. For instance, the links may be wired links or shared media (e.g., wireless links, PLC links, etc.) where certain nodes, such as, e.g., routers, sensors, computers, etc., may be in communication with other devices, e.g., based on connectivity, distance, signal strength, current operational status, location, etc.

Specifically, as shown in the example network 100, three illustrative layers are shown, namely the cloud 110, fog 120, and IoT 130. Illustratively, the cloud 110 may comprise general connectivity via the Internet 112, and may contain one or more datacenters 114 with one or more centralized servers 116 or other devices, as will be appreciated by those skilled in the art. Within the fog layer 120, various fog devices 122 (e.g., with fog modules, described below) may execute various fog computing resources on network edge devices, as opposed to datacenter/cloud-based servers or on the endpoint nodes 132 themselves of the IoT layer 130. Data packets (e.g., traffic and/or messages sent between the devices/nodes) may be exchanged among the nodes/devices of the computer network 100 using predefined network communication protocols such as certain known wired protocols, wireless protocols, PLC protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Figure 2:
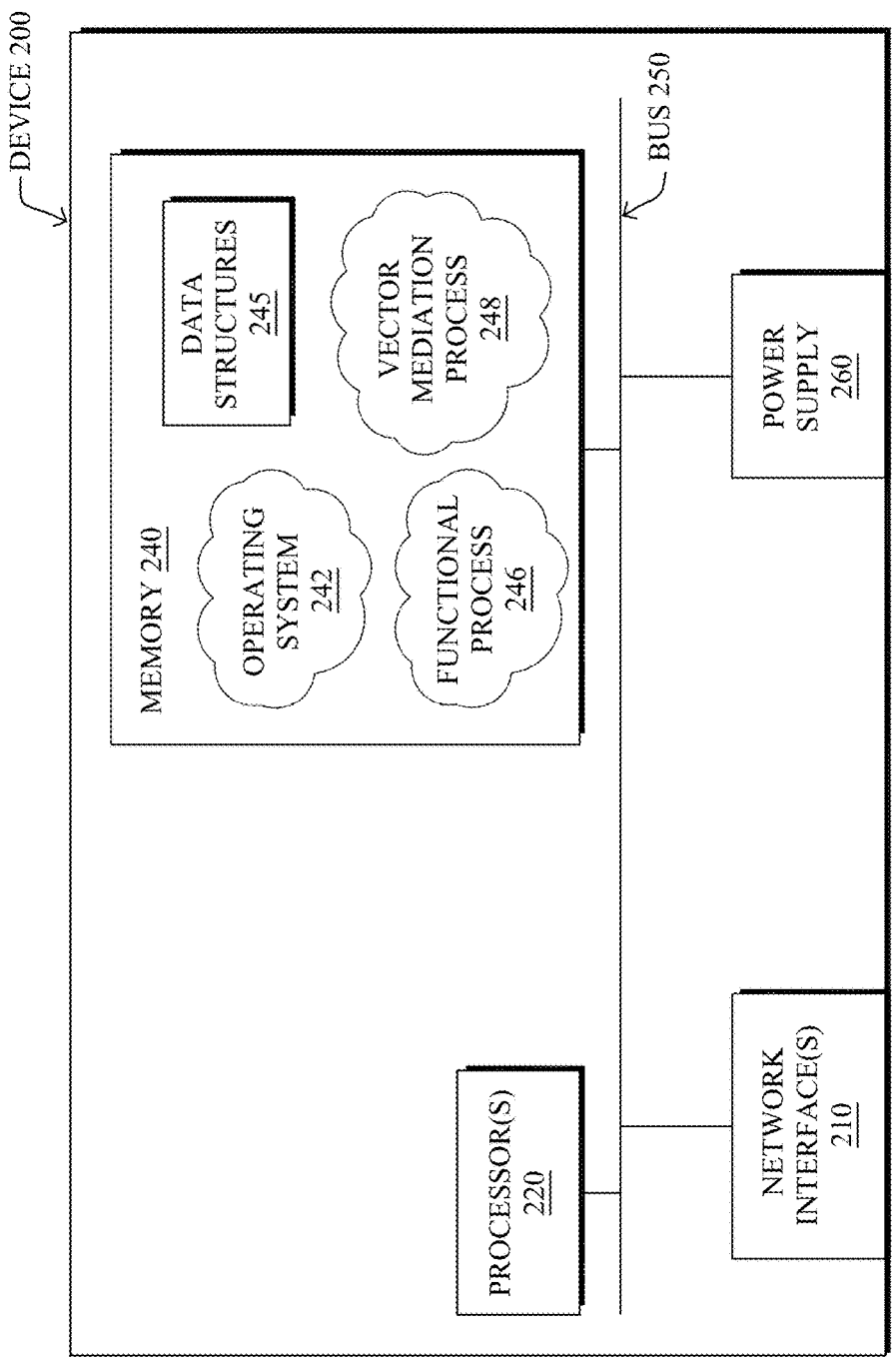
FIG. 2 illustrates an example computing device/node.

FIG. 2 is a schematic block diagram of an example computing device 200 that may be used with one or more embodiments described herein e.g., as any of the devices shown in FIG. 1 above, and particularly as specific devices as described further below. The device may comprise one or more network interfaces 210 (e.g., wired, wireless, cellular, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network 100, e.g., providing a data connection between device 200 and the data network, such as the Internet. The network interfaces may be configured to transmit and/or receive data using a variety of different communication protocols. For example, interfaces 210 may include wired transceivers, cellular transceivers, WiFi transceivers, or the like, to allow device 200 to communicate information to and from a remote computing device or server. Note, further, that the nodes may have two different types of network connections 210, e.g., wireless and wired/physical connections, and that the view herein is merely for illustration. Also, while the network interface 210 is shown separately from power supply 260, for devices using powerline communication (PLC), the network interface 210 may communicate through the power supply 260, or may be an integral component of the power supply.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise one or more functional processes 246, and on certain devices, an illustrative "vector mitigation" process 248, as described herein. Notably, functional processes 246, when executed by processor(s) 220, cause each particular device 200 to perform the various functions corresponding to the particular device's purpose and general configuration. For example, a sensor would be configured to operate as a sensor, an access point would be configured to operate as an access point, and so on.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

—Managing Vectors for Epidemic Control—

As noted above, mosquitos and other insects are the vectors for some of the most deadly diseases known to humans, such as malaria, dengue, and do on. Though vector control (e.g., applying interventions to control the vector population) is the most effective way to stop the spread of diseases. Broadly applying such interventions, however, can be prohibitively expensive. The techniques herein, however, provide for targeted interventions by classifying and detecting the target vectors.

Note that in epidemiology, a "vector" is generally an agent that carries and transmits an infectious pathogen into another living organism. Usually, vectors are organisms (e.g., insects, such as mosquitos, ticks, parasites, microbes, etc.), however, vectors may also be inanimate mediums of transmission, such as particles (e.g., dust or other particles). As used herein, therefore, it is important to note that the term "vector" may include any type of organism, particle, or other measurable carrier of some harmful disease, substance, pollutant, radiation, and so on.

The techniques herein, in particular, advance the prevention and containment of epidemics by monitoring vectors (e.g., flying insect vectors) by leveraging specifically designed sensors and integrating the sensors with IoT Edge/Fog devices. For instance, as described below, the techniques herein allow monitoring the vector levels (e.g., population, concentration, etc.) at various levels of granularity, such as single room in a city home, city block, or at the entire city level. Moreover, the integration of the sensors with the Edge/Fog devices also allows for workflows where individual Edge devices can alert local consumers thereby containing vectors at smaller numbers and preventing wide-scale infestation. Furthermore, the continuous monitoring aspects herein also provide a real-time progress report of targeted interventions.

Specifically, according to one or more embodiments of the disclosure as described in detail below, a computing device (e.g., Edge/Fog device) receives vector data from a plurality of vector-identifying sensors distributed across an area associated with the computing device. The computing device may then determine an amount of vectors within the area based on the vector data, and compares the amount of vectors to a threshold associated with the area. In response to the amount being greater than the threshold, the computing device may then trigger a remediation alarm, accordingly.

Illustratively, the techniques described herein may be performed by hardware, software, and/or firmware, such as in accordance with the illustrative "vector mitigation" process 248, which may include computer executable instructions executed by the processor 220 to perform functions relating to the techniques described herein, e.g., on one or more suitable devices, depending on the corresponding functionality of the device(s).

Figure 3:
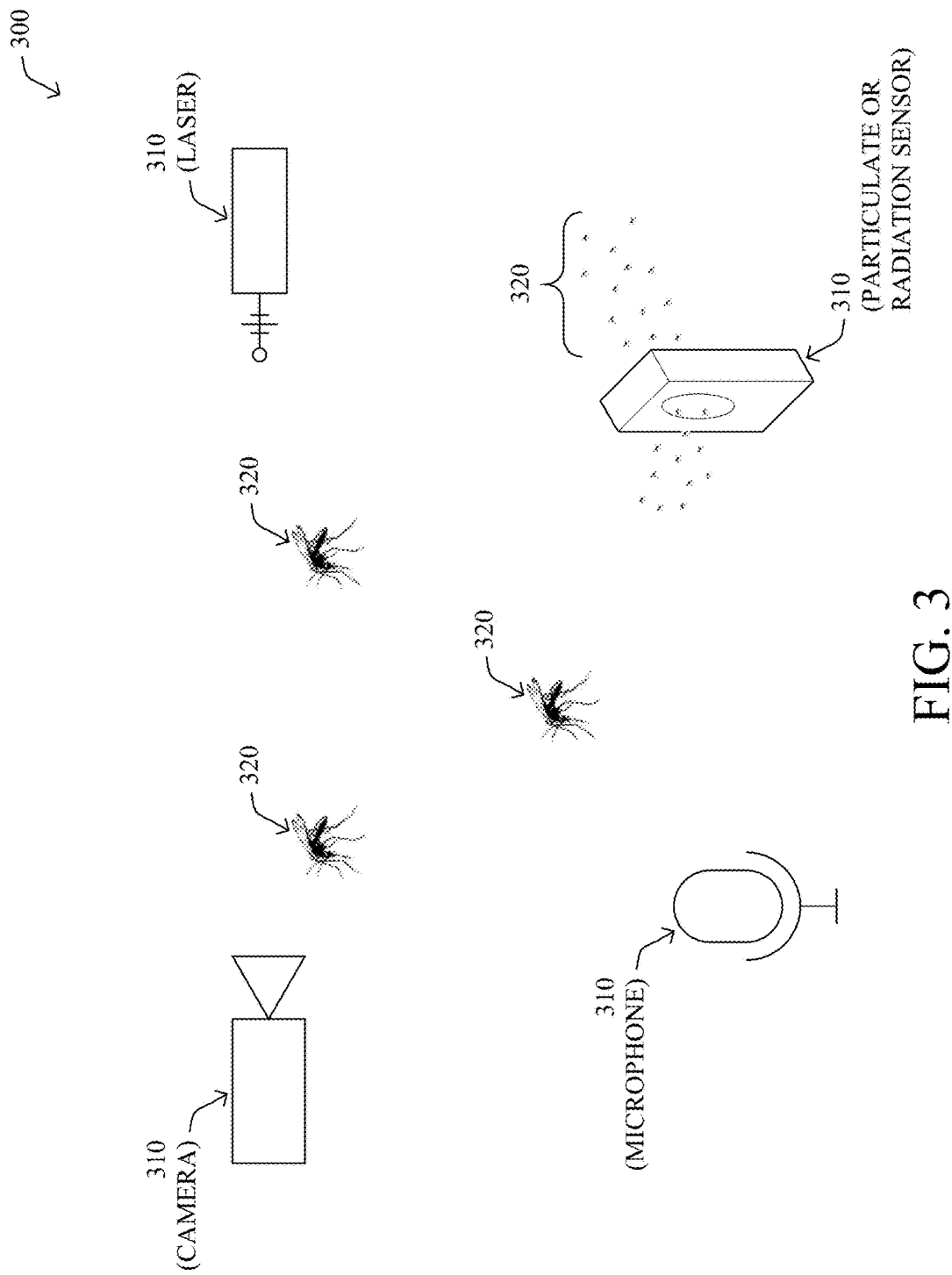
FIG. 3 illustrates an example of sensors for use with monitoring of vectors for epidemic control.

Operationally, and with reference to a simplified environment 300 of FIG. 3, an important aspect of the techniques herein is to have sensors 310 which are able to detect and classify various vectors 320 (e.g., flying insect vectors) with reasonable accuracy. Example vectors herein may include such things as detrimental insects (e.g., mosquitos, ticks, venomous spiders, etc.), dangerous animal life (e.g., coyotes, sharks, etc.), air or water pollution (e.g., particles), radiation, or even noise pollution (e.g., sound levels). Example sensors may include optical sensors (e.g., cameras, video capture devices, etc.), laser sensors, audio sensors (e.g., microphones), wingbeat sensors, particulate sensors, and radiation sensors. Notably, there have been recent developments in vector monitoring and classification sensors, such as optical sensors that use a laser beam to detect, count, and ultimately classify flying insects from a distance, or a field-deployable noise cancelling microphone for classifying insects.

As is generally understood, different breeds or species (or even gender) of organism-based vectors may carry different threats/diseases (e.g., zika, dengue, malaria, etc.). Accordingly, the level of granularity offered by the techniques herein is associated with the level of detectability of such differentiating factors. For instance, the sensors may have a sufficient enough resolution (images, sounds, etc.) so an associated video analytics capability can not only count vectors (as described below), but also classify them by species, age, sex, reproductive status, and so on.

The sensors 310 may be deployed openly within an area, and may be standalone devices (e.g., communicating with various access points or "APs") and/or may be integrated on a widely deployed device (e.g., edge/fog devices, APs, and so on). Alternatively or in addition, these sensors may also be particularly stationed with a "bait" station meant to draw in and optionally capture the vectors (e.g., a small one-way passage past a video camera with a macro lens photographing the vectors as they pass through the passage). Furthermore, in or more embodiments, these sensors may be deployed in a redundant fashion in order to better detect and/or classify the vectors, such as by using both sound processing and line-of-site sensor technologies.

Figure 4:
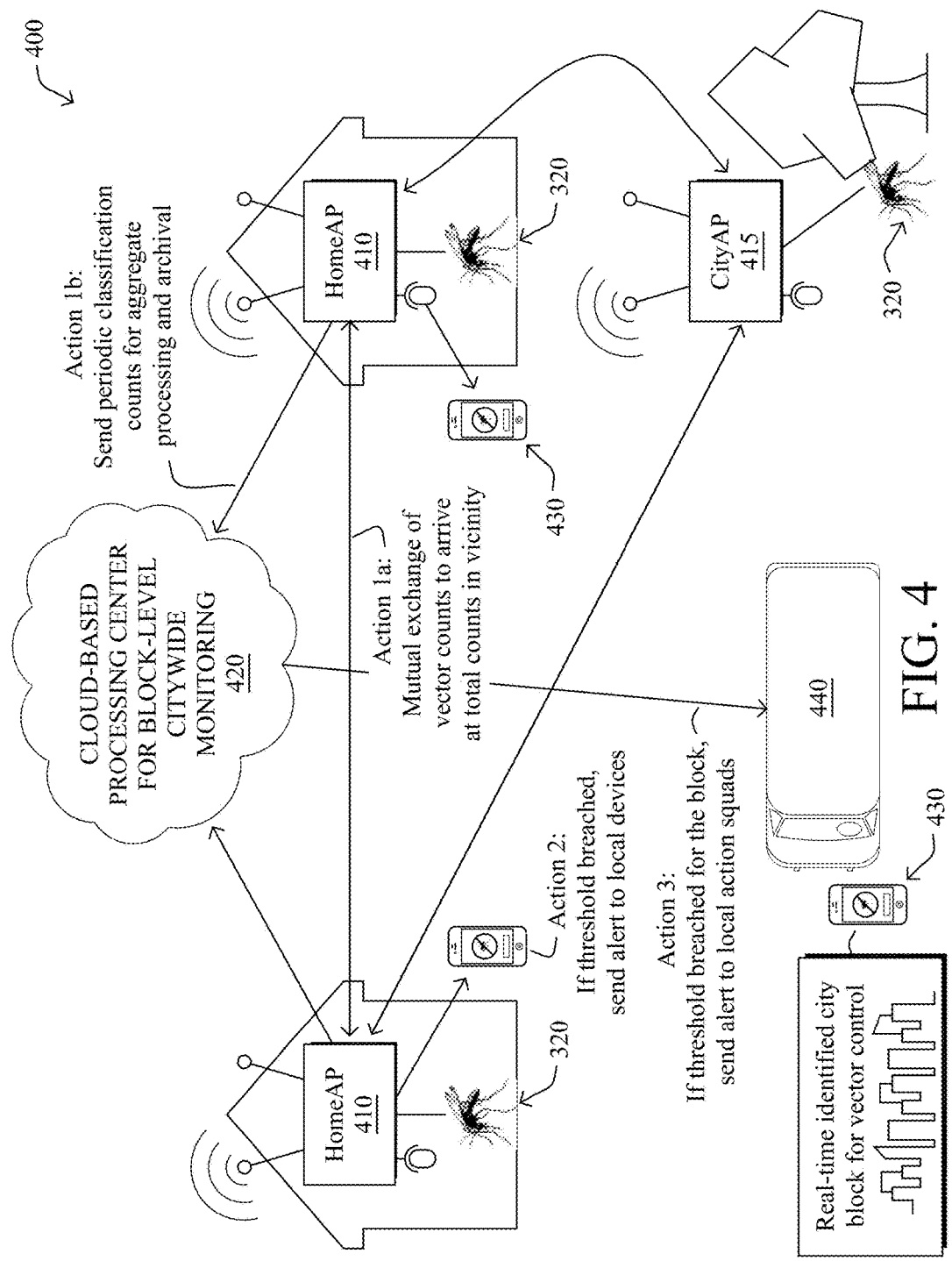
FIG. 4 illustrates an example environment where vectors may be monitored for epidemic control.

Referring now to FIG. 4, a simplified illustration of a neighborhood and city environment 400 is shown. According to the techniques herein, a primary concern for monitoring vectors 320 (illustratively flying insects, though not limited thereto) is to have the vector identification capabilities distributed in a vast majority of the locations in the area of interest. For example, to detect the 'Aegis Aegypti' mosquito in the city which causes spreads Zika/Dengue, it is important the detection capabilities present in majority of the locations in the city which humans inhabit like homes, parks, schools, etc. This requirement could be satisfied by pairing the sensors 310 with a widely deployed platform such as a home Wi-Fi access point (AP) 410 and/or city AP 415 as shown. With most cities trying to provide majority of the citizen services over the internet, it has resulted in wide-scale deployment of WiFi access points in all the private and public spaces. Another advantage of having these sensors deployed in WiFi APs is that most of these devices are powered by AC mains (as opposed to battery operated), so power-hungry sensors could also be used when integrated with such a device.

An example process flow of classification, alerting, and containment illustratively functions as follows (with reference still to FIG. 4):

Action 1 (a & b): The sensors 310 (410/415) continuously monitor the vectors 420 (e.g., flying insects) and classify them, maintaining the counts for each classified vector. The APs 410/415 exchange the accounts with neighboring APs, which have been marked as peers in the same geographical vicinity and the counts may also be sent to a cloud processing center 420 for storage, reporting, and actions at the regional level (e.g., city-level). Groups of devices in the same geographical vicinity may illustratively exchange their counts periodically to determine a common count for the vicinity.

Action 2: Once the count for a particular vector breaches a threshold, the local AP sends an alert to local devices 430 connected to that AP. This may thus warn the owners to take containment measures. Additional "if this, then that" (IFTTT) rules could be added to inform the city health department if the counts in the household are consistently above the threshold for a majority of the time (e.g., within a month.

Action 3: If the alert is detected in number of households above a regional threshold for certain block (e.g., collectively totaling above the threshold, or else a certain number of local thresholds being individually surpassed), then the alert may be raised for the entire block and all the devices in that city block will be alerted for the presence of the (potentially dangerous) vectors. The city-wide monitoring service may then dispatch containment squads 440 to the affected city block for extermination (or other remediation) of the vectors.

Follow-up: The effectiveness of the extermination or remediation can also be monitored (e.g., in real-time) to check if the remediation decreases the count of vectors. For example, effectiveness of extermination can be monitored effectively by generating hourly reports and comparing the decreasing count trends.

Notably, though the primary use-case illustrated herein has been related to insects as vectors 320, there are many other specifically contemplated use-cases herein, as well as others that will be readily apparent to those skilled in the art. Said differently, although the above-described system is illustrated for monitoring flying insect vectors, the same system can be applied for variety of other applications by utilizing appropriate sensors. The proposed system may thus also work to monitor and contain other types of regional problems such as air pollution, water pollution, noise pollution, radiation, etc. For instance, air pollution is a major problem in modern cities. The biggest factor of polluted air which affects us most is the PM2.5 and PM10 particulate matter. The techniques herein may thus be used to monitor air pollution by employing a particulate sensor which can detect PM2.5 and PM10 particulate matter in the air.

Figure 5A:
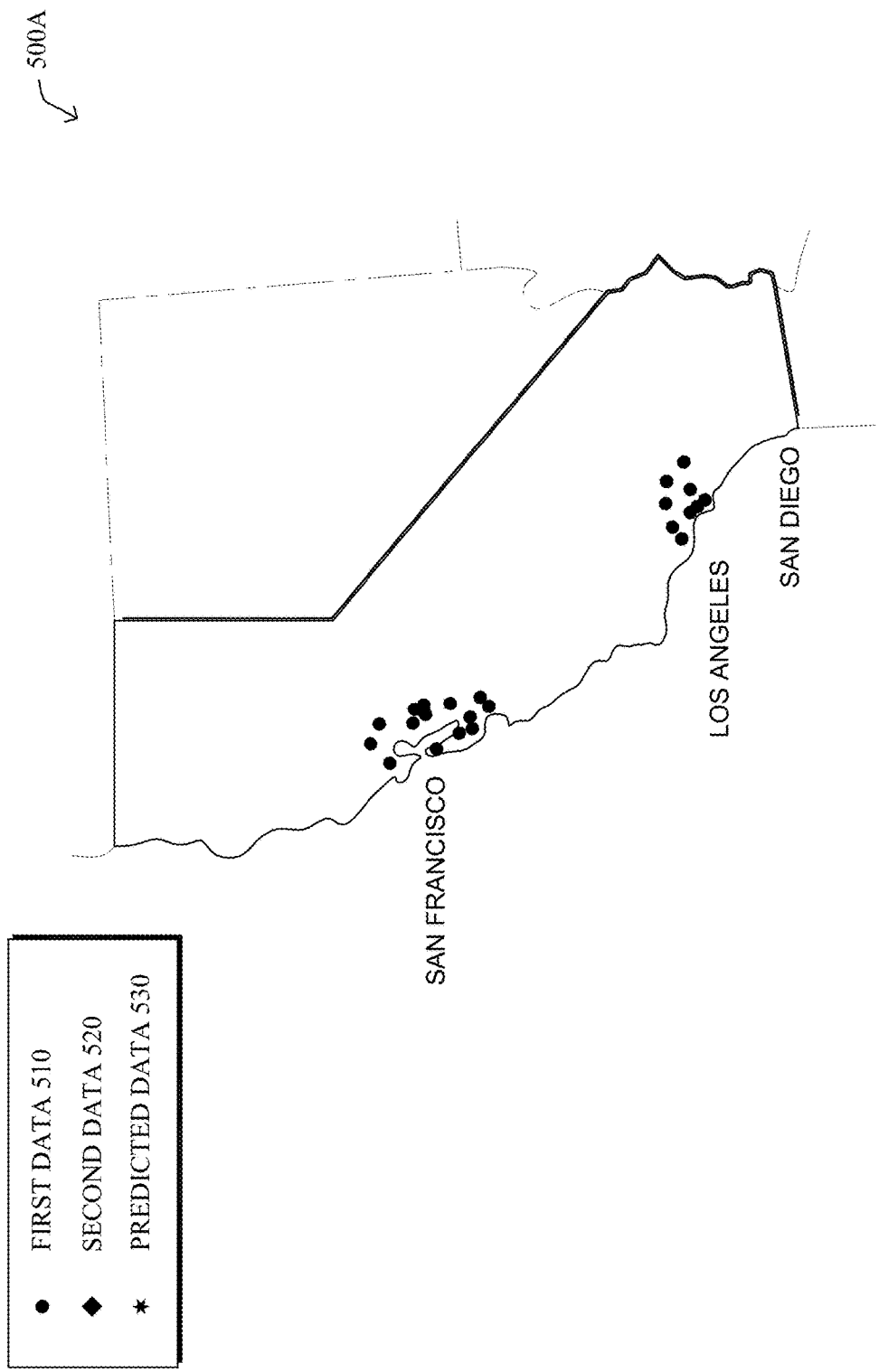

According to one or more additional embodiments of the present disclosure, the historical data collected from the spread of vectors and progression of infestation can also be used to build predictive models to determine the pattern of spread of the infestation into the future (e.g., for a particular type of vector in a particular area of interest). For example, the historical data can be used to build predictive models based on machine learning on streaming data or based on analysis of data from the past. FIGS. 5A-5C illustrate an example of geographical tracking (e.g., past, present, future) of vectors based on vector data. For instance, map 500A of FIG. 5A illustrates a first data set 510 representing the locations of detected vectors (or detected vectors above a given threshold). As can be seen by comparison to a second data set 520 in map 500B of FIG. 5B, the vectors appear to be spreading out beyond their initial footprint, and have appeared in other cities, as well. Accordingly, as shown by map 500C of FIG. 5C, a predicted data set 530 may be computed by various algorithms to predict future spread of the vectors, accordingly (e.g., based on travel metrics, wind direction, steady spreading speeds, animal/insect migration patterns, and so on).

Note further that in regards to pollution and/or radiation, one of the biggest challenges (e.g., for tackling PM2.5 air pollution) is to detect the source of the pollution. When edge devices with sensors are deployed city-wide, real-time detection of the source of the pollution is possible, and based on the factors like humidity/wind the spread can be accurately predicted. The techniques herein also provide accurate data to take containment actions.

Figure 6:
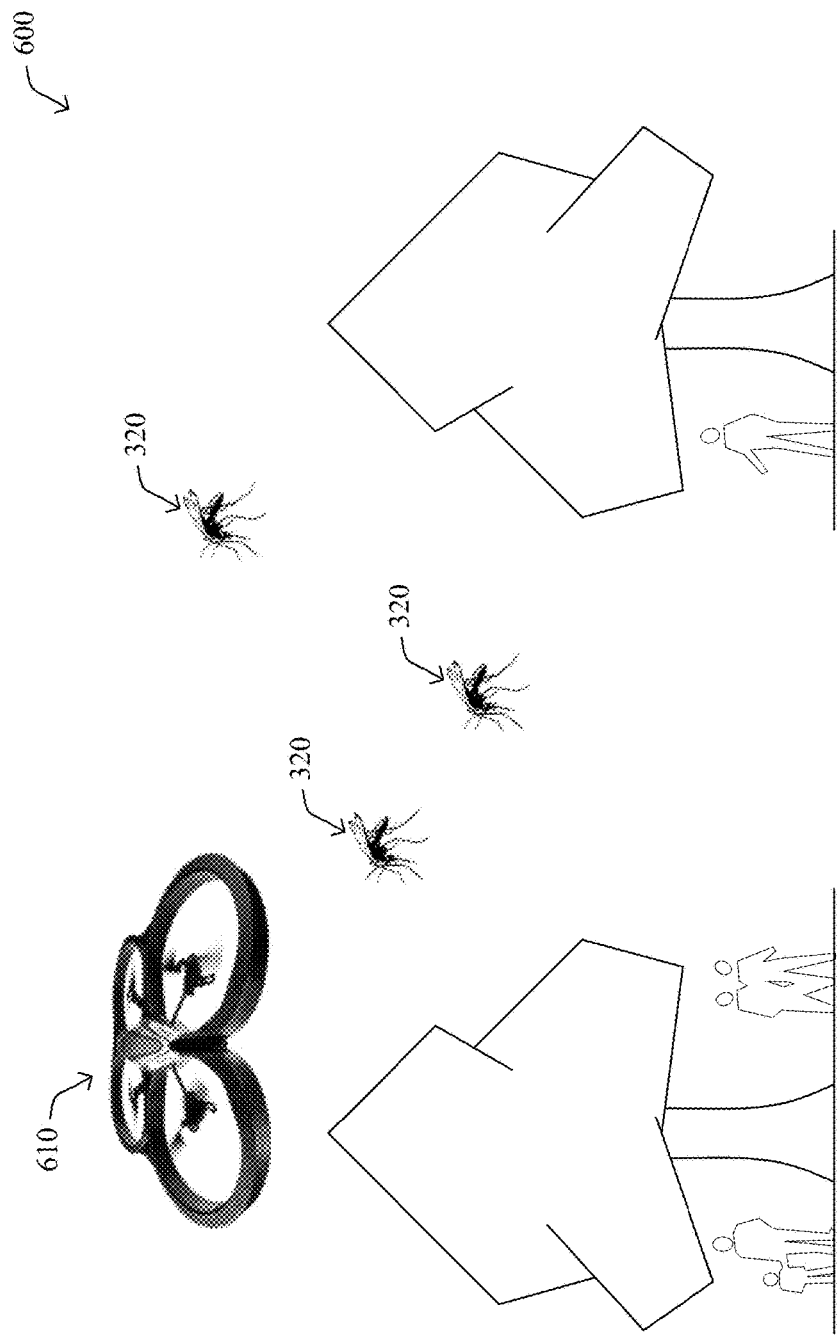
FIG. 6 illustrates an example of unmanned aerial vehicle (UAV) monitoring of vectors for epidemic control.

In still another embodiment, illustrated in FIG. 6 an area 600 may be monitored by one or more unmanned aerial vehicles (UAVs) or drones 610 may be fitted with sensors 310 and/or remediation mechanisms (e.g., nets, pesticide, etc.), and flown around specific areas 600 to take vector readings, and either act autonomously or else in communication with a centralized processing facility. This technique could help localize infestations to within tens of meters. Also, when an infestation is found, the drone could carry a supply of insecticide and apply immediate treatment, reducing the further spread of certain diseases.

Figure 7:
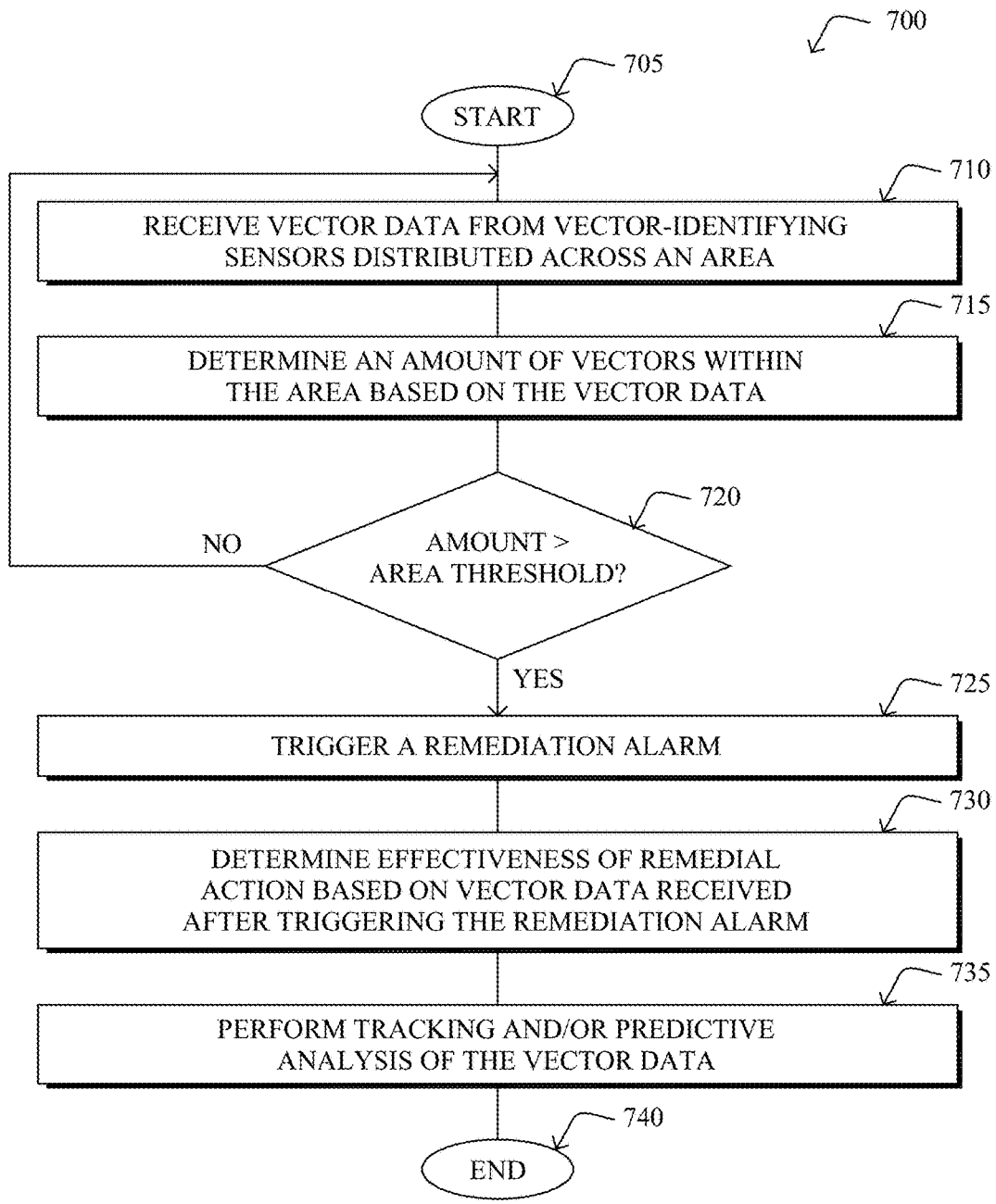
FIG. 7 illustrates an example simplified procedure for the monitoring of vectors for epidemic control.

FIG. 7 illustrates an example simplified procedure for monitoring of vectors for epidemic control in accordance with one or more embodiments described herein. For example, a non-generic, specifically configured device (e.g., device 200) may perform procedure 700 by executing stored instructions (e.g., process 248). The procedure 700 may start at step 705, and continues to step 710, where, as described in greater detail above, a device (e.g., a local AP, a regional Edge/Fog device, or a cloud computing device) receives vector data from a plurality of vector-identifying sensors 310 distributed across an area associated with the computing device (e.g., a house, a city block, a neighborhood, or a larger region). Based on the vector data, the computing device may determine an amount of vectors within the area in step 715, as described above. Note again that the sensors and/or computing device may be specifically configured to distinguish between particular types of vectors, such as distinguishing between harmless species of insects and disease-carrying species of insects, and the amount (e.g., count) of vectors may be per distinguishable type, accordingly.

Once, in step 720 after comparing the amount of vectors to a threshold associated with the area, the amount is greater than the threshold (e.g., a threshold associated with a particular type of vector), then in step 725 the techniques herein trigger a remediation alarm, as described above. Note that in the simplified illustrative procedure 700, an example perspective from a single computing device is taken. However, as detailed above, when the area is a localized area (e.g., a home AP), then the threshold may be a correspondingly localized threshold, such that triggering comprises sending the remediation alarm to one or more localized devices associated with the localized area (e.g., home extermination or evacuation messages). However, on the other hand, when the computing device is an Edge/Fog or even cloud device, then the area may be a larger region (e.g., city block, neighborhood, etc.) consisting of a plurality of localized areas (e.g., households), and the threshold may be a regional threshold, accordingly. As such, triggering in step 725 in this instance would thus comprise sending the remediation alarm to one or more devices associated with the region (e.g., generalized extermination, generalized evacuation, CDC notification, etc.).

Note further that in one particular embodiment, one or more of the vector-identifying sensors may be carried on a UAV/drone 610. In this embodiment, therefore, step 725 may comprise instructing the UAV to take remedial action against vectors in the area in response to (or as part of) the remediation alarm.

In accordance with one or more optional embodiments herein, in step 730 the effectiveness of remedial action may be further determined based on vector data received after triggering the remediation alarm (e.g., did extermination reduce the amount of vectors for a given area?). Also, in step 735, tracking and/or predictive analysis of the vector data may be performed, as noted above. For example, in one embodiment, based on assimilating vector data from a plurality of areas, the techniques herein may track movement of vectors across a geographic region. In another embodiment, a predictive model of vector movement and occurrence may be built based on the vector data over time. In still another embodiment, in a similar manner, an estimated source of pollution vectors may be determined based on widespread vector data.

The procedure 700 illustratively ends in step 740, though notably with the option to continue monitoring vectors in step 710, performing further analysis in step 735, or otherwise returning to any suitable step in the procedure above.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for monitoring of vectors for epidemic control. In particular, the techniques herein provide for real-time automated monitoring that requires little to no intervention from human operators, where, for example, Fog computing capabilities of the platform allow for local alerts based on IFTTT even when the cloud link is down. (That is, there is no need for the data and analysis to be performed in the cloud, but instead may be controlled locally.) By exchanging data with localized peers, the system herein can detect more regional infestations quickly and can pinpoint exact target areas for remediation (e.g., extermination). Generally, the techniques herein address a globally important problem, and the fine granularity that IoT-based sensors can bring to it, according to one or more embodiments herein, have significant advantages. Furthermore, as described above, the techniques herein may provide a real-time picture of the spread of the infestation, and a measure of the effectiveness of the remediation, whether for infectious diseases, harmful insects, pollution, radiation, and so on.

While there have been shown and described illustrative embodiments that provide for monitoring of vectors for epidemic control, it is to be understood that various other adaptations and modifications may be made within the spirit and scope of the embodiments herein. For example, while certain embodiments are described herein with respect to certain types of vectors and vector-identifying sensors, the techniques herein are not limited to merely those mentioned herein. In addition, while certain Edge/Fog devices are shown, such as access points, gateways, etc., other suitable devices may be used, accordingly. That is, the embodiments have been shown and described herein with relation to specific network configurations (orientations, topologies, protocols, terminology, etc.), and particularly to "fog" computing. However, the embodiments in their broader sense are not as limited, and may, in fact, be used with other types of networks and protocols, regardless of their nomenclature.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
    receiving, at a computing device in a fog layer of a computer network between a cloud network and a local network, vector data relating to a vector in an area from a plurality of vector-identifying sensors distributed across the area associated with the computing device, wherein the vector is an agent that carries and transmits an infectious pathogen into another living organism;
    determining, by the computing device, an amount of vectors within the area based on the vector data;
    comparing, by the computing device, the amount of vectors to a threshold associated with the area; and
    triggering, by the computing device, a remediation alarm that is sent to local devices connected to the computing device in the local network in response to the amount being greater than the threshold, wherein the remediation alarm warns users of the local devices to take containment measures.

2. The method as in claim 1, wherein the area is a localized area and the threshold is a localized threshold, and wherein triggering comprises:
    sending the remediation alarm to one or more localized devices associated with the localized area.

3. The method as in claim 1, wherein the area is a region consisting of a plurality of localized areas and the threshold is a regional threshold, and wherein triggering comprises:
    sending the remediation alarm to one or more devices associated with the region.

4. The method as in claim 1, further comprising:
    assimilating vector data from a plurality of areas; and
    tracking movement of vectors across a geographic region based on the assimilated vector data.

5. The method as in claim 1, further comprising:
    determining effectiveness of remedial action based on vector data received after triggering the remediation alarm.

6. The method as in claim 1, further comprising:
    building a predictive model of vector movement and occurrence based on the vector data over time.

7. The method as in claim 1, wherein vectors are selected from a group consisting of: detrimental insects; dangerous animal life; air pollution; water pollution; noise pollution; and radiation.

8. The method as in claim 1, wherein vector-identifying sensors are selected from a group consisting of: optical sensors; laser sensors; audio sensors; wingbeat sensors; particulate sensors; and radiation sensors.

9. The method as in claim 1, further comprising:
    determining an estimated source of pollution vectors based on widespread vector data.

10. The method as in claim 1, further comprising:
    distinguishing between particular types of vectors, wherein the threshold is associated with a particular type of vector.

11. The method as in claim 10, wherein vectors are insects, and wherein distinguishing between particular types of vectors comprises:
    distinguishing between harmless species of insects and disease-carrying species of insects.

12. The method as in claim 1, wherein one or more of the vector-identifying sensors are carried on an unmanned aerial vehicle (UAV).

13. The method as in claim 12, further comprising:
    instructing the UAV to take remedial action against vectors in the area in response to the remediation alarm.

14. An apparatus, comprising:
    one or more network interfaces configured to communicate in a computer network;
    a processor coupled to the network interfaces and adapted to execute one or more processes; and
    a memory configured to store a process executable by the processor, the process when executed operable to:
        receive vector data relating to a vector in an area from a plurality of vector-identifying sensors distributed across the area associated with the computing device, wherein the vector is an agent that carries and transmits an infectious pathogen into another living organism;
        determine an amount of vectors within the area based on the vector data;
        compare the amount of vectors to a threshold associated with the area; and
        trigger a remediation alarm that is sent to local devices connected to the computing device in the local network in response to the amount being greater than the threshold, wherein the remediation alarm warns users of the local devices to take containment measures,
    wherein the apparatus is a computing device in a fog layer of the computer network between a cloud network and a local network.

15. The apparatus as in claim 14, wherein the area is a localized area and the threshold is a localized threshold, and wherein the process when executed to trigger is further operable to:
    send the remediation alarm to one or more localized devices associated with the localized area.

16. The apparatus as in claim 14, wherein the area is a region consisting of a plurality of localized areas and the threshold is a regional threshold, and wherein the process when executed to trigger is further operable to:

send the remediation alarm to one or more devices associated with the region.

17. The apparatus as in claim 14, wherein the process when executed is further operable to:

assimilate vector data from a plurality of areas; and
track movement of vectors across a geographic region based on the assimilated vector data.

18. The apparatus as in claim 14, wherein the process when executed is further operable to:

determine effectiveness of remedial action based on vector data received after triggering the remediation alarm.

19. The apparatus as in claim 14, wherein the process when executed is further operable to:

build a predictive model of vector movement and occurrence based on the vector data over time.

20. A tangible, non-transitory, computer-readable medium storing program instructions that cause a computer to execute a process comprising:

receiving vector data related to a vector in an area at a fog layer of the computer network between a cloud network and a local network from a plurality of vector-identifying sensors distributed across the area associated with the computing device, wherein the vector is an agent that carries and transmits an infectious pathogen into another living organism;

determining an amount of vectors within the area based on the vector data;

comparing the amount of vectors to a threshold associated with the area; and triggering that is sent to local devices connected to the computing device in the local network in response to the amount being greater than the threshold, wherein the remediation alarm warns users of the local devices to take containment measures, wherein the apparatus is a computing device in a fog layer of the computer network between a cloud network and a local network.

* * * * *